UNITED STATES PATENT OFFICE.

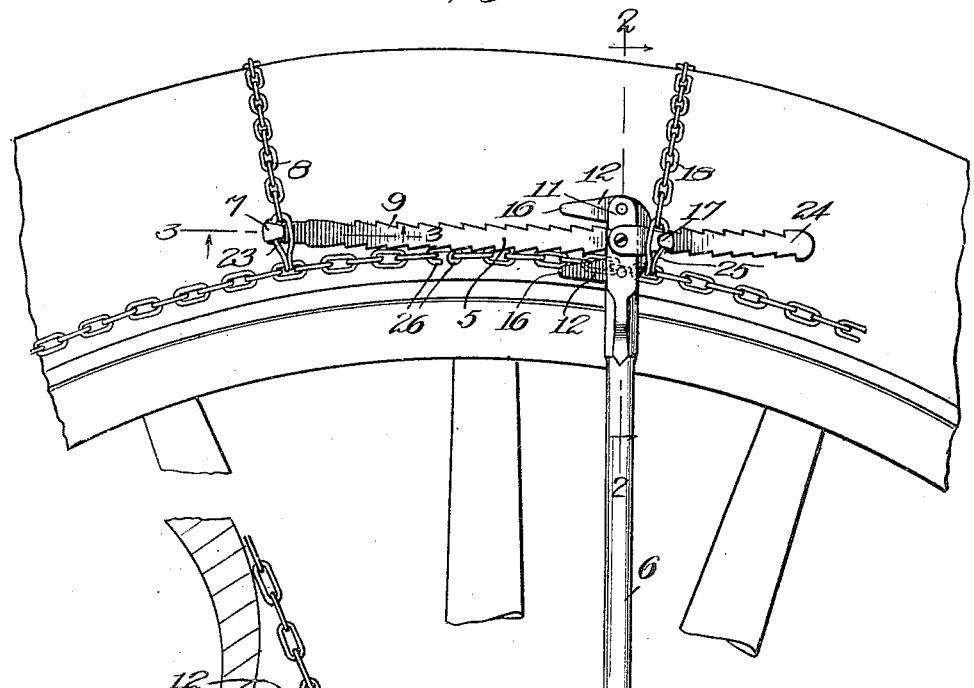
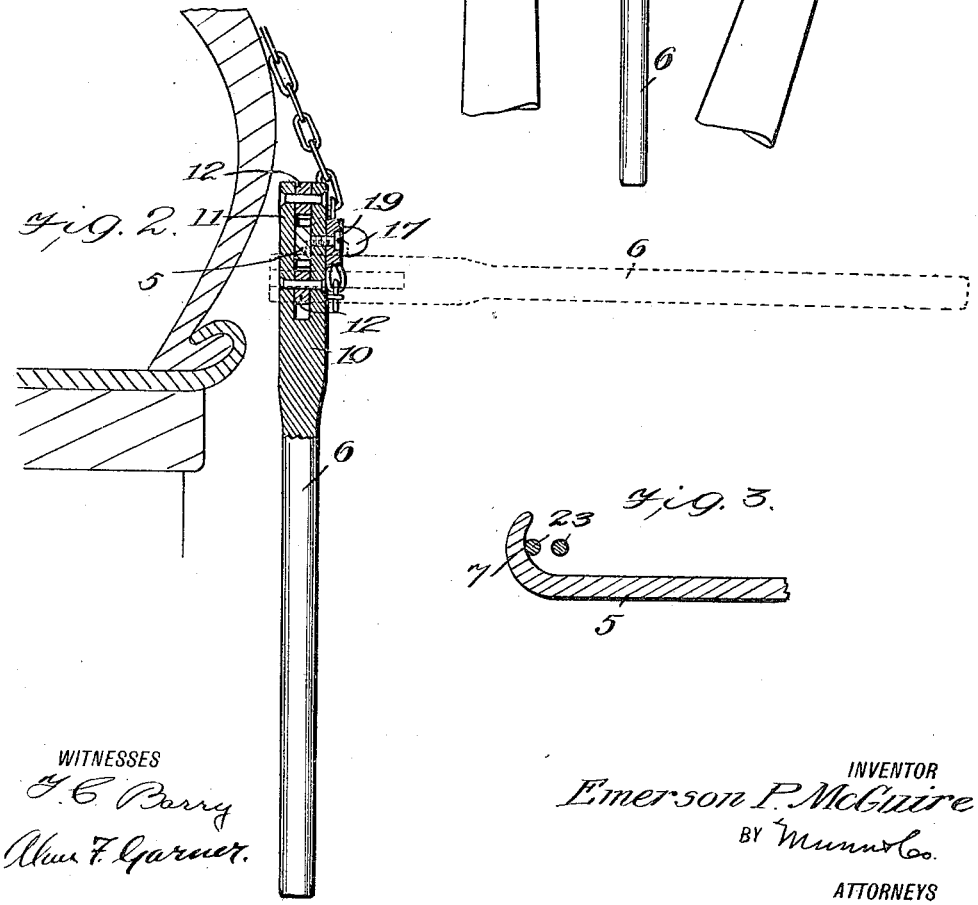

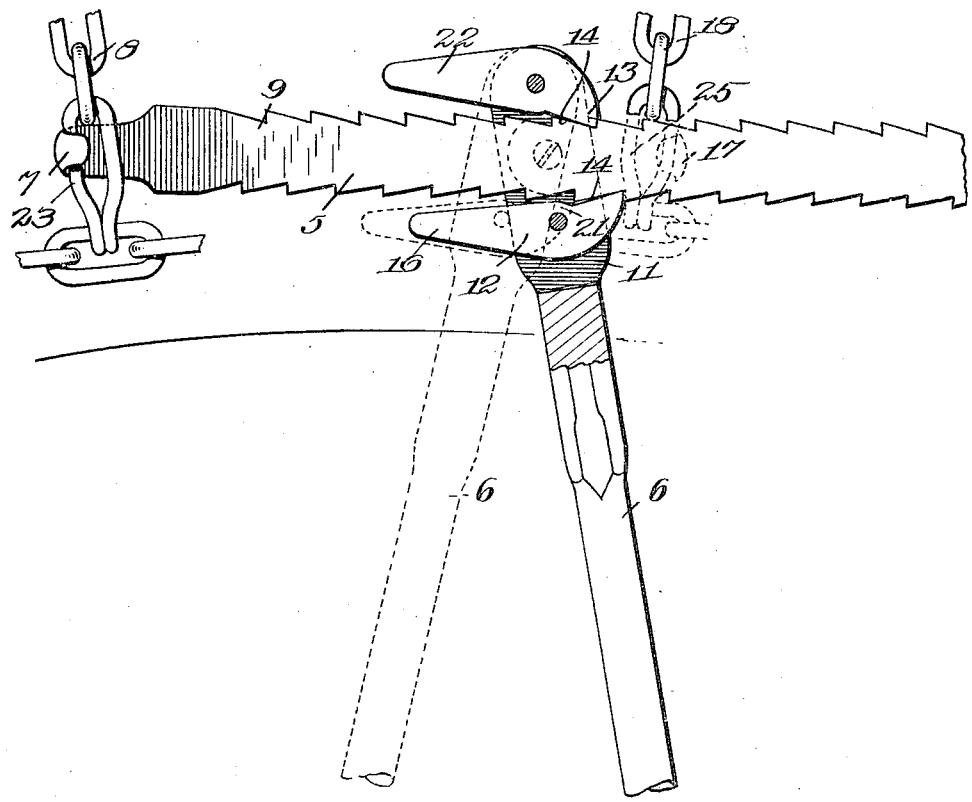
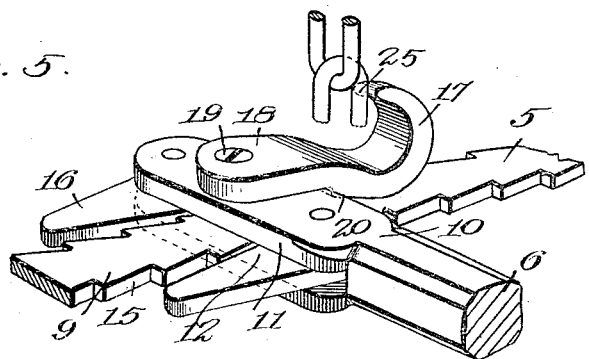

EMERSON P. McGUIRE, OF VAN HOUTEN, NEW MEXICO.

CHAIN-TOOL.

1,133,870.

Specification of Letters Patent.

Patented Mar. 30, 1915.

Application filed June 9, 1914. Serial No. 844,057.

*To all whom it may concern:*

Be it known that I, EMERSON P. McGUIRE, a citizen of the United States, residing at Van Houten, in the county of Colfax and State of New Mexico, have invented a new and useful Improvement in Chain-Tools, of which the following is a specification.

This invention relates to tools, and more particularly to chain tools.

One of the principal objects of the invention is to provide a tool by means of which the non-skid or mud chains used on automobile wheels may be tightened.

Another object of the invention is to provide a tool of the class described including a double rack bar having a hook at one end to engage one end of the chain, and a lever provided with pawls for coöperating with the rack bar, the lever carrying a hook for engaging the opposite end of the chain.

A further object of the invention is to provide a tool of the class described, which will be simple, durable, extremely efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the figures, of which:

Figure 1 represents an elevational view of the tool showing the same in operation and looking from the outside of the vehicle wheel. Fig. 2 represents a vertical transverse sectional view taken on the plane indicated by the line 2—2 of Fig. 1 looking in the direction indicated by the arrows. Fig. 3 represents a detail horizontal view taken on the plane indicated by the line 3—3 of Fig. 1 looking in the direction indicated by the arrow. Fig. 4 represents an enlarged view similar to Fig. 1, a portion of the lever being broken away, and Fig. 5 represents a detail perspective fragmentary view indicating the position of the lever and rack bar relative to the cross chain during the operation of removing the tool.

Referring more particularly to the drawings, the tool includes a double rack bar 5 and a lever 6, the former provided at one end with a hook 7, adapted to engage one end of cross chain 8 of the anti-skid chain, the teeth 9 on both sides of the rack bar extending toward the hooked end thereof, and being disposed in staggered relation, the teeth upon one side occurring slightly in advance of those on the other side of the bar.

The inner end of lever 6 is enlarged as at 10 and bifurcated to form a pair of spaced parallel arms 11, and swiveled in spaced relation between arms 11, is a pair of pawls 12, which extend in the same direction, and are provided at one end with nose portions 13, having inner faces 14 which are beveled to conform with the outer faces 15 of teeth 9. The opposite ends of the pawls are extended as at 16 to provide finger holds whereby when the extended ends are pressed toward each other the nose or teeth engaging portions 13 of the pawls may be separated, to maintain them out of engagement with the rack teeth. The pawls are disposed at such a distance apart that the rack bar may slide between them.

A hook 17 is immovably secured to one of the arms 11, and extends in the same direction as hook 7 and is oppositely disposed relatively thereto, said hook 17 being adapted to engage the cross chain 18 at the opposite end of the anti-skid chain. Hook 17 which is disposed to one side of the inner end of lever 6, is formed on the shank 18, secured by means of a screw 19 to one of the arms 11. Said shank 18 is provided with a shoulder 20 adapted to abut against one longitudinal edge of the arm to which the hook is secured, for preventing movement of the hook relative to the arm as will be readily understood.

As illustrated in Fig. 4, the pawls are provided at the inner ends of the beveled portions 14, with rounded shoulders 21 which merge into the inner edges 22 of the pawls, said edges normally diverging from the rack bar to a slight degree, and as the lever is reciprocated from the full to the dotted line positions indicated in Fig. 4, the shoulders 21 co-act with the rack teeth to alternately throw the nose portions 13 into engagement with the teeth as will be understood, thereby moving the rack bar step by step through the enlarged end of the lever, thus drawing hook 7 toward hook 17. When it is desired to attach an anti-skid chain to a vehicle wheel, the chain is placed loosely upon the tire in the ordinary manner and the ends of the chain on the inner side of the vehicle wheel are connected. The rack bar then is disposed against the tire on the outside of the wheel, with the hook 7 directed away from the tire and this hook is then slid under end chain 8 and is engaged against the outer terminal link 23 thereof in the manner shown in Figs. 1 and 4. The hook 17 carried by lever 6, which lever had previously been slid onto the rack bar at its outer end 24, is then engaged under the terminal link 25 of chain 18 in the manner indicated in Fig. 1, and upon reciprocation of lever 6 the hooks will be drawn together, thus tightening the chain, until the end 26 of the outer side chain may be hooked together.

In removing the tool upon the completion of the operation just described the lever is raised from its depending vertical position upwardly into the dotted line position indicated in Fig. 2, thus twisting hooks 7 and 17 relatively to the links which they engage, until the hooks slip off of the links in the manner indicated in Fig. 5, and in order to facilitate this the hooks are curved to about the degree indicated in Fig. 3, the curvature being enough to prevent the hooks disengaging from the links during the process of tightening the chain, but allowing the hooks to slip off of the links when the former are twisted by raising the lever.

Another method of removing the tool after tightening the chain, would be to press together the finger portions 16 of the pawls and withdraw the rack bar from the lever.

Although I have described the preferred embodiment of my invention I may desire to make such changes in the construction combination and arrangement of parts thereof as do not depart from the spirit of the invention and the scope of the appended claim.

I claim:

A chain tool adapted to be inserted between a chain and the tire of a wheel for stretching said chain upon the tire, said tool comprising a double rack bar, a hook formed at one end of said bar and extending laterally therefrom, a lever having a pair of pawls adapted to coöperate with the rack bar in moving the same relatively to the lever, and a hook carried by the lever in a position opposite the first said hook and also extending laterally from said bar, last said hook being secured upon said lever and adapted to lie, in operating position, in the same horizontal plane as said rack bar and first said hook.

EMERSON P. McGUIRE.

Witnesses:
G. FRED AGEE,
ERNEST BROMELLI.

Copies of this patent may be obtained for five cents each, by addressing the "Commissioner of Patents, Washington, D. C."